Aug. 23, 1932.  H. A. MYERS  1,872,790
TOOL HOLDER
Filed Dec. 10, 1928
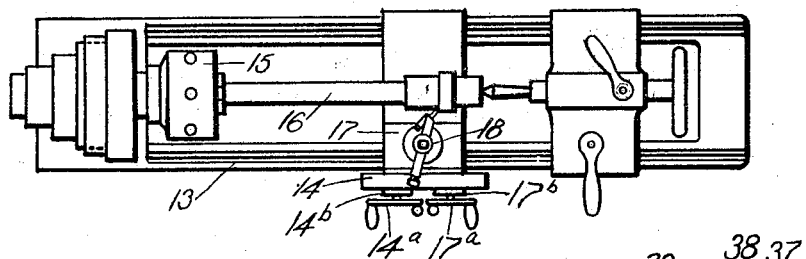
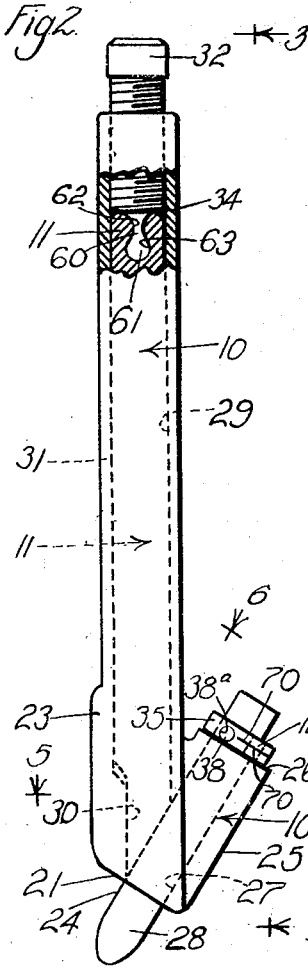
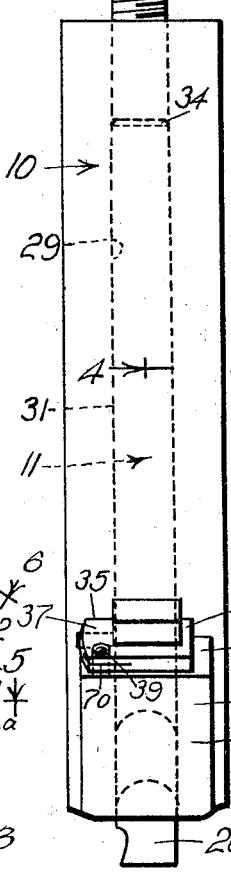
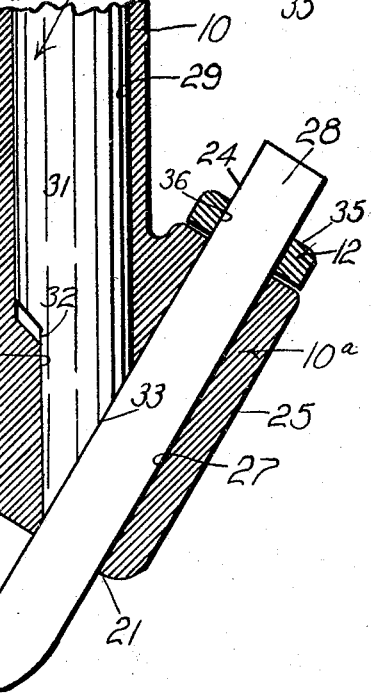
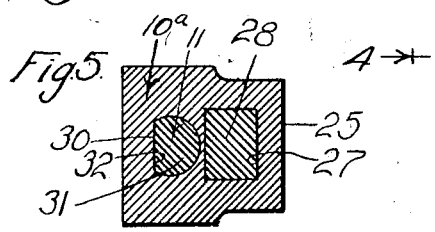
Inventor
Herman A. Myers
by his Attorney Patented Aug. 23, 1932

1,872,790

UNITED STATES PATENT OFFICE

HERMAN A. MYERS, OF WHITTIER, CALIFORNIA

TOOL HOLDER

Application filed December 10, 1928. Serial No. 324,935.

This invention has to do with a tool holder, and relates particularly to a tool holder adapted for use in lathes and like machines.

When it is desired to turn a number of articles of the same size and shape in a lathe, it is necessary to set various cutting tools in the tool carrier successively and to feed them in certain definite positions with relation to the lathe axis. If the articles being turned have several parts of different diameters several settings of the lathe tools are required at different distances from the axis of the lathe. It is also necessary to measure the work each time a cut is made to determine whether or not it is to the desired size. These operations consume considerable time and therefore add materially to the cost of production.

It is an object of this invention to provide a tool holder which facilitates rapid, accurate, setting of tools in predetermined positions relative to the axis of the lathe.

Another object of this invention is to provide a stop applicable to a lathe tool or the like, to facilitate setting of the tool in a predetermined position in a holder.

It is another object of this invention to provide a stop of the character mentioned embodying means whereby it can be effectively adjusted to adjust the position of the tool relative to the holder.

It is a further object of this invention to provide a tool holder adapted to releasably hold tools carrying stop members so that the stop members cooperate with the holder to locate the tool in predetermined positions in the holder.

Further objects and features of my invention will be best and more fully understood from the following detailed description of a typical form and application of the invention, throughout which description I will refer to the accompanying drawing, in which:

Fig. 1 is a plan view of a typical lathe showing the device provided by this invention in operating position thereon, Fig. 2 is a plan view of the device apart from the lathe, Fig. 3 is a view taken as indicated by line 3—3 on Fig. 2, Fig. 4 is an enlarged detailed sectional view taken as indicated by line 4—4 on Fig. 3, Fig. 5 is a detailed sectional view taken as indicated by line 5—5 on Fig. 2; and Fig. 5 is an enlarged detailed view taken as indicated by line 6—6 on Fig. 2.

In Fig. 1 of the drawing, the device provided by the invention is shown held in operating position in a lathe of typical construction. The lathe includes a chassis or bed 13, a carriage 14, a chuck 15, a tail piece, and various other parts common to machines of this character. A piece of work 16 is shown carried between the chuck and the tail piece. The device provided by this invention is shown held in a tool post 18 on a head 17 mounted for transverse movement on the carriage 14.

The carriage 14 is movable longitudinally of the bed 13 under control of a hand crank 14ª while the head 17 is movable transversely on the carriage under control of a hand crank 17ª. The position of the carriage is indicated by a dial 14ᵇ on the carriage while the position of the head is indicated by a dial 17ᵇ on the carriage.

The device provided by this invention includes, generally, a body 10 adapted to be held in the tool post of a lathe, a head 10ª on the body to carry a tool, tool clamping means 11, carried by the body, and a gauge 12 to be applied to the tool and to cooperate with the head.

The body 10 of the device may be formed and proportioned to be clamped in the standard type of tool post 18. The body 10, in the preferred form of the invention, is rectangular in cross sectional configuration, and may be of any desired length.

The head 10ª of the device is formed on one end of the body. The head 10ª is in the form of an enlargement on the body, and is angularly disposed with reference to the body and projects from one side of the body so that its outer end 26 is located to one side of the body while its inner end is coincident with the inner end of the body as clearly shown in the drawing. The opposite side of the body is enlarged adjacent to end 21 of the head by a part 23. The outer side 25 of the head 10ª extends between the ends of the head. The ends 21 and 26 of the head are flat and at right angles to the longitudinal axis of the head. An opening 27 extends centrally through the head 10ª longitudinally of the head. The opening 27 is provided to receive a standard type of lathe tool 28 and is preferably rectangular in cross section. It is obvious that when the device is designed to hold tools of special shape that the opening in the head 10ª may be formed to receive them.

A centrally located opening 29 extends longitudinally through the body 10. The opening 29 is preferably round and extends into and joins the rectangular opening 27 in the head 10ª. The opening 29 is provided with a restricted portion having a flat shoulder or wall 30, which extends along one side of the opening for a suitable distance from its inner end.

The tool clamping means 11 includes a mandrel or rod 31 and an actuating set screw 32. The rod 31 is preferably round and is slidably carried in the opening 29 of the body. The rod 31 is provided at its inner end portion with a reduced part having a flat side 32. The flat side 32 is somewhat longer than the shoulder 30 of the opening 29 and is provided to suitably engage the shoulder 30 to prevent the rod from rotating in the opening.

The rod 31 is angularly truncated at its inner end so that the end 33 is disposed parallel with the axis of the opening 27 through the head 10ª. The end 33 of the rod is adapted to fit against or engage the side 24 of the tool 28 which is in the opening 27. The outer end of the rod 31 terminates within the outer end portion of the opening 29.

The rod 31 is adapted to be actuated or clamped against a tool by the set screw 32 screw-threaded into the outer end of the opening 29 so that it engages the outer end of the rod 31. The set screw 32 may be provided with a polygonal head as shown in the drawings. The edge 34 at the outer end of the rod 31 is beveled to prevent the end of the rod from spreading and binding against the sides of the opening 29. The screw and rod are connected so that the rod is pulled away from the tool when the screw is backed out of the opening 29. In the preferred construction the rod end of the set screw is provided with a neck 60, and is enlarged at 63 to form a socket to carry the head 61. In manufacture the parts just described are assembled by pressing the rod on or around the neck and head so that the rod and set screw form a permanent assembly. The construction allows the screw to turn free of the rod.

The tool gauge 12 includes a collar 35 adapted to be clamped on the tool 28, and to cooperatively engage the head 10ª of the holder, means for setting the collar on the tool, and means for adjusting the cooperative relation of the collar with reference to the holder. The collar 35 is made to fit over the tool 28. In practice the opening 36 through the collar may be shaped to correspond, generally, with the cross sectional configuration of the tool 28, and the configuration of the exterior of the collar may correspond, generally, to that of the opening 36. In the case illustrated the exterior of the collar is rectangular and the collar is provided with a substantially central rectangular opening 36, provided to freely receive the tool 28.

The means provided for setting the collar on the tool preferably comprises a set screw 38 carried by the collar to engage the tool. The set screw may be threaded in an opening 38ª formed in the collar transversely of the axis of the opening 36 through the collar and so that it extends into the opening 36. The inner end of the set screw 38 may project into the opening 36 to engage or clamp against a tool 28 extending through the opening 36. The outer end of the set screw is exposed so that it can be engaged by a suitable operating tool.

The means provided for adjusting the collar with reference to the holder may comprise a set screw 39 carried by the collar to cooperatively engage the holder. The set screw 39 may be threaded in an opening 39ª formed through the collar parallel with the opening 36 and may extend completely through the collar from one end to the other so that the screw end of the set screw may be engaged by an operating tool from the other end of the collar. In accordance with the invention the collar is split or provided with a cut 70 extending transversely of the opening 39ª and the collar is sprung so that the screw is always tight in the opening 39ª.

In the preferred arrangement the set screws are arranged together or adjacent one another in an enlarged part 37 of the collar as shown throughout the drawing. The set screws 38 and 39 are preferably provided with socket heads and do not normally project from the collar 35. The collar 35 is not connected or attached to the holder, and when the tool 28 is removed from the holder the collar 35 remains clamped on the tool by means of the set screw 38.

In operating the device the body 10 of the holder is rigidly clamped in the tool post 18 of the lathe so that a tool 28 in the holder is at the desired cutting angle. The cutting tool 28 is then clamped in the opening 27 of the head 10ª at approximately the desired setting. The collar 35 is clamped or set on the tool 28 adjacent one end of the head 10ª, preferably adjacent the end 26 of the head. The tool may be adjusted in the holder by loosening the set screw 32 and moving the tool relative to the head by actuating the set screw 39 against the end of the head 10ª. When the tool is in the desired position in the holder the set screw 39 engages the holder and the set screws are all made tight and the cutting edge of the tool is brought to the cutting position relative to the axis of the lathe by means of the crank handle 17ª which controls the lead of the lathe carriage. The said position of the tool may be, in fact preferably is, obtained by feeding the tool to cut a piece of work in the lathe to a desired dimension. The reading on the dial 17ᵇ is noted.

The tool 28 can thereafter be removed from the holder and replaced in the holder and brought to the said operating position whenever desired without measuring or gauging it with reference to the work in the lathe. To return the tool to exactly the same position in which it was originally positioned to make a cut to a desired diameter, it is arranged in the holder so that the set screw 39 engages the holder, thus gauging the position of the tool in the holder whenever the tool may be set in the holder by set screw 32, and the hand crank 17ª operated to move the head of the carriage until the reading of the dial 17ᵇ corresponds to that previously noted. It is to be understood that the positioning of the collar on the tool is not to be disturbed after the original setting is made. It will be obvious that a plurality of tools 28 may be equipped with collars and a plurality of different operating positions determined for said tools by noting the dial readings. In this way a plurality of objects can be turned to like dimensions by suitable selection of tools and observations of dial readings, and without measuring each object as it is being turned, as is ordinarily necessary. For purpose of example a typical operation will be described.

After a cut has been made following a setting of the tool, the tool is removed from the holder after loosening the set screw 32. The collar is allowed to remain clamped on the tool. When a like cut is to be made on a subsequent piece of work, the same tool is inserted in the holder until the set screw 39 engages the end 26 of the head 10ª. The set screw 32 is then tightened, clamping the tool in the holder. The hand crank is then actuated to advance the tool to the same position it was in when the said cut was made on the previous piece of work, this being done by operating the hand crank until the said dial reading is obtained. If there is more than one cut or dimension to be made on each article, the same method of tool setting is applied to several tools, that is, a cutting tool and collar are provided for each cut. The various tools 28 for the different cuts, with the collars clamped on them, are inserted into the holder as the various cuts are to be made. When the device provided by this invention is used, it is possible to turn out a great number of identical pieces of work with only one setting of the tools. It is obvious that the invention may be applied in many ways in machine shop practice. For example, it may be used in a boring bar, or the like, and may be applied to various types of work.

It is to be noted that the head 10ª does not extend to the top or bottom faces of the body 10 and that the axis of the opening 27 through the head is in a horizontal plane when the device is in operating position. The head is related to the body as shown in the drawings and allows the holder to be arranged on a stepped tool post plate with the head extending freely over the step above the one on which the holder rests. The holder can therefore be firmly seated on a stepped tool post plate with the head extending to either side of the body. The opening 27 through the head being horizontal when the holder is in operating position, allows the holder to be turned so that the head projects in either direction from the body or in either direction lengthwise of the work. Further, it is to be noted that the holder can be set in a tool post with the tool 28 close to the post and therefore firm. It is also to be noted that the active or cutting end of the tool 28 is substantially in line with the body being only slightly offset when the device is set, as shown in the drawings. This minimizes the tendency for the holder to twist or turn in the tool post.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. In combination, a tool, a body, releasable means for rigidly clamping the tool against movement relative to the body, and means for gauging the tool with respect to the body, including a collar detachably clamped on the tool at the exterior of the body, there being a slit in the collar so that the collar has split portions, and a screw threaded transversely through the said split portions and adapted to engage the body, the split portions normally holding the screw against movement.

2. In combination, a tool, a body, releasable means for rigidly clamping the tool against movement relative to the body including a rod slidable in an opening in the body, a screw for actuating the rod to clamp it against the tool, a rotatable connection between the rod and screw, and means for holding the rod against rotation, a collar detachably clamped on the tool at the exterior of the body, there being a slit in the body providing it with split portions, and a screw threaded through a transverse opening in the split portions and adapted to engage the body to gauge the tool, the split portions normally holding the screw against movement.

In witness that I claim the foregoing I have hereunto subscribed my name this 23rd day of November, 1928.

HERMAN A. MYERS.